United States Patent
Lin et al.

(10) Patent No.: US 11,380,986 B2
(45) Date of Patent: Jul. 5, 2022

(54) WIRELESS COMMUNICATION DEVICE AND METHOD

(71) Applicant: HTC CORPORATION, Taoyuan (TW)

(72) Inventors: Cheng Hung Lin, Taoyuan (TW); Chia Te Chien, Taoyuan (TW); Chun Hsien Lee, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 16/537,959

(22) Filed: Aug. 12, 2019

(65) Prior Publication Data

US 2021/0050664 A1    Feb. 18, 2021

(51) Int. Cl.
  *H01Q 3/06*    (2006.01)
  *H01Q 1/24*    (2006.01)
  *H01Q 21/06*   (2006.01)
  *H04M 1/02*    (2006.01)

(52) U.S. Cl.
  CPC ............. *H01Q 3/06* (2013.01); *H01Q 1/242* (2013.01); *H01Q 21/065* (2013.01); *H04M 1/026* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 3,671,969 A | * | 6/1972 | Basman | G01S 3/42 342/426 |
| 3,798,649 A | * | 3/1974 | Houng | G01S 3/44 342/425 |

(Continued)

FOREIGN PATENT DOCUMENTS

| | | |
|---|---|---|
| CN | 1574459 A | 2/2005 |
| CN | 203466980 U | 3/2014 |

(Continued)

OTHER PUBLICATIONS

CNIPA Office Action for corresponding CN Application No. 201911000540.9; dated Jun. 15, 2021.

(Continued)

*Primary Examiner* — Zhitong Chen
(74) *Attorney, Agent, or Firm* — Cantor Colburn LLP (57) ABSTRACT

A wireless communication device and method are provided. The wireless communication device includes a main body, a rotating module and an antenna module. The main body includes a housing and an RF signal module accommodated in the housing; the rotating module is accommodated in the housing and located at one side of the RF signal module, and includes a rotor motor and a rotating shaft, and the rotor motor is connected to the rotating shaft for rotating the rotating shaft; the antenna module is accommodated in the housing and disposed on the rotating shaft, and is electrically connected to the RF signal module. The wireless signal communication method includes: rotating the antenna module, determining the intensity of the RF signal received by the antenna module, and stopping the rotation of the antenna module. Therefore, the antenna module can dynamically adjust its orientation to receive the RF signal with sufficient intensity.

9 Claims, 9 Drawing Sheets

(56) References Cited

U.S. PATENT DOCUMENTS

| | | | |
|---|---|---|---|
| 6,278,405 B1* | 8/2001 | Ha | G01S 3/38 |
| | | | 342/359 |
| 6,816,121 B1 | 11/2004 | Cheng et al. | |
| 7,162,273 B1* | 1/2007 | Abramov | H01Q 3/04 |
| | | | 342/383 |
| 7,856,206 B2* | 12/2010 | Hyslop | H01Q 3/02 |
| | | | 343/714 |
| 10,244,579 B2* | 3/2019 | Pi | H04W 88/10 |
| 2008/0248798 A1* | 10/2008 | Chung | H01Q 1/1257 |
| | | | 455/425 |
| 2009/0231225 A1* | 9/2009 | Choudhury | H01Q 3/26 |
| | | | 343/770 |
| 2012/0032876 A1* | 2/2012 | Tabe | H04B 1/3838 |
| | | | 345/156 |
| 2012/0146858 A1* | 6/2012 | Tsai | H01Q 1/2266 |
| | | | 343/702 |
| 2012/0172084 A1 | 7/2012 | Wu et al. | |
| 2013/0157729 A1* | 6/2013 | Tabe | H04W 52/0245 |
| | | | 455/573 |
| 2015/0269474 A1* | 9/2015 | Finn | H01Q 1/38 |
| | | | 235/492 |
| 2016/0149315 A1* | 5/2016 | Elsherbini | H01Q 1/245 |
| | | | 455/101 |
| 2017/0062909 A1* | 3/2017 | Alpaslan | H01Q 1/243 |
| 2017/0062922 A1* | 3/2017 | Hirabe | H01Q 3/08 |
| 2017/0110787 A1* | 4/2017 | Ouyang | H01Q 1/243 |
| 2017/0110790 A1 | 4/2017 | Kim | |
| 2018/0090816 A1* | 3/2018 | Mow | H01Q 1/243 |
| 2018/0219637 A1 | 8/2018 | Mow et al. | |
| 2018/0259778 A1 | 9/2018 | Pu et al. | |
| 2019/0020114 A1* | 1/2019 | Paulotto | H01Q 5/378 |
| 2019/0165449 A1* | 5/2019 | Kim | H01L 23/66 |
| 2019/0319367 A1* | 10/2019 | Edwards | H01Q 3/2605 |

FOREIGN PATENT DOCUMENTS

| | | |
|---|---|---|
| CN | 105633597 A | 6/2016 |
| CN | 106602226 A | 4/2017 |
| CN | 108574523 A | 9/2018 |
| CN | 106027086 B | 3/2019 |
| CN | 109687921 A | 4/2019 |

OTHER PUBLICATIONS

CNIPA Office Action for corresponding CN Application No. 201911000540.9; dated Sep. 17, 2021.

TIPO Office Action for corresponding TW Application No. 108137302; dated Dec. 18, 2020.

TIPO Office Action for corresponding TW Application No. 11020182220; dated Dec. 18, 2020, with English summary.

TIPO Office Action for corresponding TW Application No. 108137302; dated Apr. 26, 2022.

* cited by examiner

WIRELESS COMMUNICATION DEVICE AND METHOD

BACKGROUND OF THE INVENTION

Field of the Invention

The present invention relates to a wireless communication device and method, and more particularly, relates to a wireless communication device and method having a rotatable antenna.

Descriptions of the Related Art

With the vigorous development of the wireless communication industry, people's demands for wireless data transmission are increasing day by day. In order to meet the demands of users, a fast wireless transmission speed is necessary. Therefore, the fifth generation of mobile communication system (5G) provided with a higher bandwidth and a lower transmission delay has been mainly developed by current wireless communication devices.

Frequency bands currently used by the 5G mobile communication system generally include two categories, namely, a frequency band not greater than 6 Hz and a frequency band not less than 24 GHz, and the frequency band not less than 24 GHz is also called a millimeter Wave (mmWave) frequency band. As compared to the frequency band of a lower frequency, the mmWave frequency band has an advantage of rapid transmitting signals, but it also has a disadvantage of large attenuation of signals during transmission thereof due to poor diffraction capability. In order to improve the problem of signal attenuation, the transmission of millimeter waves requires antenna technologies such as massive multi-input multi-output (MIMO) and beam forming or the like. However, beam forming imparts high directivity to the transmission of the millimeter waves, and the wireless communication fails once mmWave beams cannot be transmitted/received by the antenna in a specific direction.

Therefore, it is insufficient for the wireless communication device to have only one antenna for transceiving millimeter waves, and instead, multiple antennas are required in order to cover multiple transmitting/receiving orientations. However, in order to provide enough space for the accommodation and operation of the multiple antennas, the size (e.g., width) of the wireless communication device may need to be increased or the size of other elements in the wireless communication device may need to be decreased (e.g., the size of the battery may need to be decreased, which results in the reduction of the electricity capacity). Moreover, even if the wireless communication device is provided with multiple antennas, it may be hard to receive the signal of a base station, and thus the user needs to change the orientation of the wireless communication device.

According to the above descriptions, the wireless communication device and method may be improved at least in the above aspects.

SUMMARY OF THE INVENTION

An objective of the present invention is to provide a wireless communication device and method, which are capable of dynamically adjusting the orientation of an antenna module for transceiving wireless signals so that the antenna can effectively receive and transmit wireless signals to achieve better communication quality. Moreover, the same coverage is maintained while reducing the number of the antenna modules, so the usage space inside the wireless communication device is saved.

To achieve the aforesaid objective, a wireless communication device provided by the present invention comprises a main body, a rotating module and an antenna module. The main body includes a housing and an RF signal module accommodated in the housing. The rotating module is accommodated in the housing and located at one side of the RF signal module, and includes a rotor motor and a rotating shaft, wherein the rotor motor is connected to the rotating shaft for rotating the rotating shaft. The antenna module is accommodated in the housing and disposed on the rotating shaft, and is electrically connected to the RF signal module.

In an embodiment, the antenna module at least comprises an antenna array for transceiving millimeter wave RF signals.

In an embodiment, a width of the antenna module ranges from 5 mm to 8 mm.

In an embodiment, the rotating shaft is directly connected to the rotor motor.

In an embodiment, the rotating module further comprises a transmission mechanism, and the rotating shaft is connected to the rotor motor through the transmission mechanism.

In an embodiment, the rotating angle of the rotating shaft is not greater than 360 degrees.

In an embodiment, the wireless communication device further comprises another antenna module, and the another antenna module is accommodated within the housing and located at another side of the RF signal module.

A wireless signal communication method provided by the present invention comprises: rotating an antenna module within a wireless communication device; determining the intensity of an RF signal received by the antenna module; and stopping the rotation of the antenna module.

In an embodiment, the wireless signal communication method further comprises: stopping the rotation of the antenna module when it is determined that the intensity of the RF signal received by the antenna module is higher than a set value.

In an embodiment, the wireless signal communication method further comprises: rotating the antenna module to another orientation when it is determined that the intensity of the RF signal received by the antenna module is lower than a set value.

In an embodiment, the wireless signal communication method further comprises rotating the antenna module by a circle to establish relationships between the rotating angle of the antenna module and the intensity of the RF signal.

In an embodiment, the rotating angle of the antenna module is not greater than 360 degrees in the wireless signal communication method.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, specific embodiments of the present invention will be described specifically. However, the present invention may be implemented by embodiments of various forms without departing from the spirit of the present invention, and the scope claimed in the present invention shall not be interpreted as being limited to what described in the specification.

As used herein, the singular forms "a" and "an" are intended to include the plural forms as well, unless the context clearly indicates otherwise. Furthermore, terms "first" and "second" are used herein to describe various elements or components instead of indicating the sequence or priority of these elements or components. Moreover, orientations described herein (e.g., front, back, upper, lower, two sides, inside, outside or the like) are relative orientations that may be defined depending on the usage status of a wireless communication device, and are not intended to indicate or imply that the wireless communication device needs to have constructions or operations in particular orientations, and the present invention shall not be interpreted as being limited by these orientations.

The wireless communication device of the present invention may be an electronic product capable of performing wireless communication, such as a mobile phone, a tablet computer, a virtual reality device, a notebook computer, a network sharing device, or a hub. Hereinafter, technical contents of various components will be described by taking the mobile phone as an exemplary example, but the present invention is not limited thereto. Furthermore, the wireless communication device may be a device that is capable of transceiving millimeter waves and suitable for the 5G mobile communication system.

Figure 1:
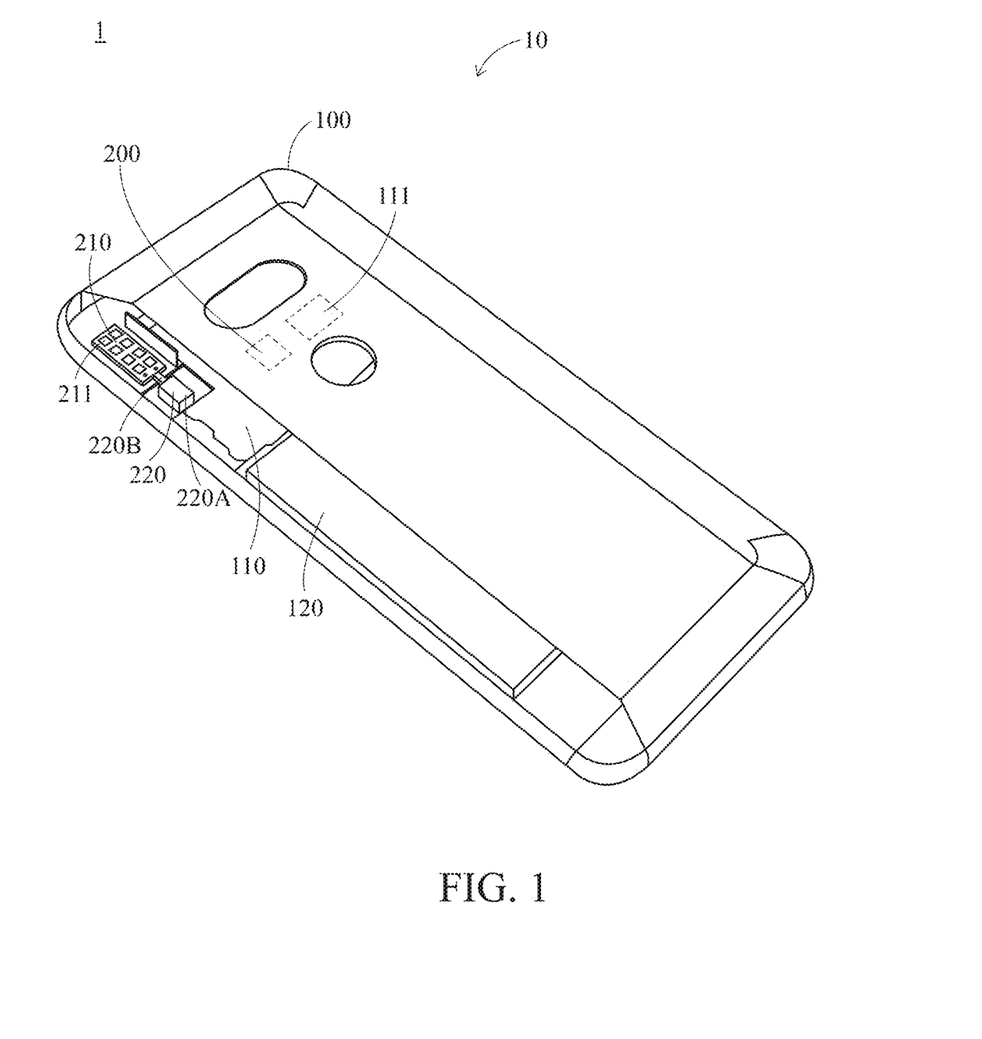
FIG. 1 is a perspective view of a wireless communication device according to a first preferred embodiment of the present invention (a part of a housing is viewed in cross section)
Figure 2:
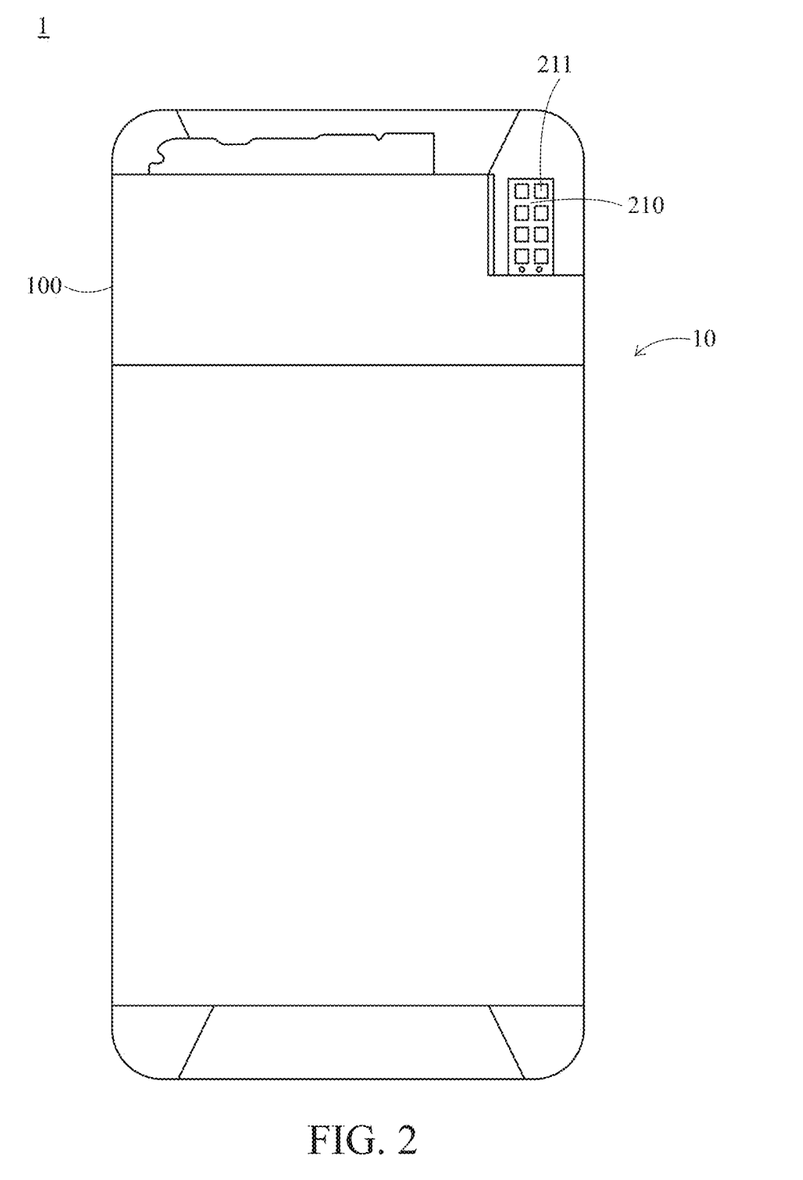
FIG. 2 is a front view of the wireless communication device shown in FIG. 1 (a part of the housing is viewed in cross section)
Figure 3:
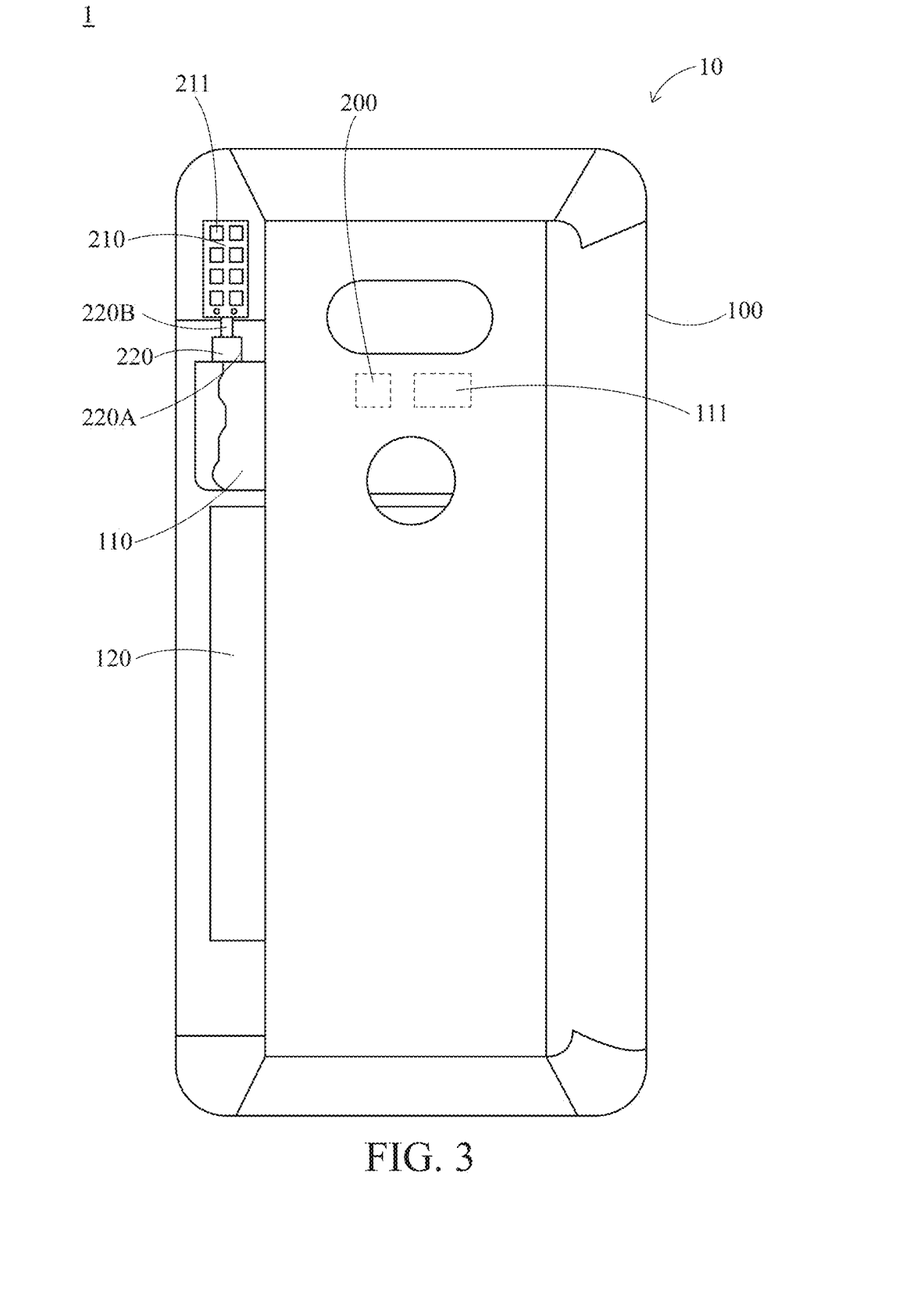
FIG. 3 is a back view of a wireless communication device, of which the internal construction is omitted, according to a preferred embodiment of the present invention (a part of a housing is viewed in cross section)

Please refer to FIG. 1 to FIG. 3, which are a perspective view, a front view and a back view of a wireless communication device 1 according to a first preferred embodiment of the present invention. The wireless communication device 1 may comprise a main body 10, an antenna module 210, a rotating module 220 or the like, and technical contents of these components will be sequentially described as follows.

The main body 10 may comprise a housing 100 and an RF signal module 200, the housing 100 may further comprise structures such as a display portion (e.g., a display screen and the frame thereof of a mobile phone) and a back portion (e.g., a back cover of the mobile phone), and the housing 100 has an accommodating space therein for accommodating other elements such as the RF signal module 200 or the like, e.g., a circuit board 110 (with electronic elements such as a microprocessor 111 disposed thereon), a battery 120 or the like. The RF signal module (which is also called an RF control module) 200 may be disposed on the circuit board 110 and electrically connected to other elements such as the processor 111. The RF signal module 200 is mainly used to process wireless RF signals (which are called RF signals hereinafter) received and transmitted by the antenna module 210 that is described later, e.g., perform conversion between RF signals and digital signals, and power amplification or the like. The RF signal module 200 may comprise one or more chips and may also comprise an impedance match circuit, and may be further integrated with electronic elements associated with other functions into a chip. For example, the RF signal module 200 may be a commercially available chip, such as Snapdragon X50 of Qualcomm. Additionally, the RF signal module 200 may be packaged integrally with the antenna module 210 described later to serve as an Antenna in Package (not shown).

Figure 4:
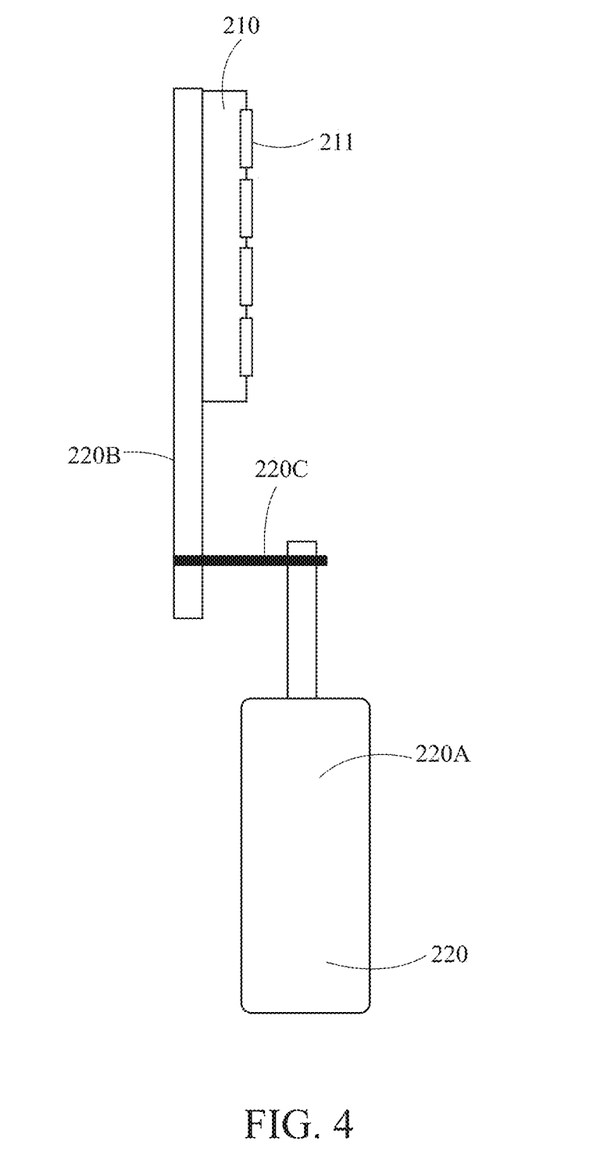
FIG. 4 is a schematic view of an antenna module and a rotating module according to a preferred embodiment of the present invention.

The rotating module 220 may be accommodated within the housing 100 of the main body 10, and may be fixed on the circuit board 110 and located at one side of the RF signal module 200 or the like. The rotating module 220 may comprise a rotor motor 220A and a rotating shaft 220B, and the rotor motor 220A is connected to the rotating shaft 220B for rotating the rotating shaft 220B. The rotor motor 220A may be a step motor which are capable of controlling the rotating angle of the shaft of the motor, and the shaft of the motor does not require a high rotating speed. Preferably, the rotating shaft 220B is directly connected to the rotor motor 220A, i.e., the rotating shaft 220B is directly sleeved and fixed onto the shaft of the rotor motor 220, thereby reducing the space occupied by the rotating module 220. Besides, the rotating module 220 may also comprise a transmission mechanism 220C (as shown in FIG. 4) if it is hard for the rotating shaft 220B to be directly connected to the rotor motor 220A, so that the rotating shaft 220B is indirectly connected to the rotor motor 220A through the transmission mechanism 220C. The transmission mechanism 220C may be a belt, a gear or one of other elements that can be linked between the rotor motor 220A and the rotating shaft 220B.

The antenna module 210 is also accommodated within the housing 100 and fixedly disposed on the rotating shaft 220B. Thus, when the rotor motor 220A rotates the rotating shaft 220B, the antenna module 210 may accordingly be rotated to various angles so as to receive and transmit mmWave RF signals at different orientations. Furthermore, the antenna module 210 is also electrically connected with the RF signal module 200 on the circuit board 110 (e.g., electrically connected via a flexible wire, a flat cable or a circuit board) in order to transmit the RF signal received to the RF signal module 200, or on the contrary, send the signal to the outside. Preferably, in order to prevent the antenna module 210 from being blocked by the user when the user holds the wireless communication device 1 or to prevent the antenna module 210 from being located excessively near other electronic elements, the antenna module 210 may be preferably located at a corner of the housing 100. The width of the antenna module 210 may range from 5 mm to 8 mm (without being limited thereto) and is smaller than the thickness of the housing 100, and the antenna module 210 will not hit against the housing 100 or other surrounding parts during the rotation thereof.

Moreover, the antenna module 210 may at least comprise an antenna array 211 for transceiving mmWave RF signals, and the antenna array 211 comprises a plurality of antenna units which are arranged on a circuit board of the antenna module 210 in a one-dimension or two-dimension direction. The antenna array 211 has the beam forming function and is capable of focusing the RF signals in a particular direction so as to increase antenna gain. As shown in FIG. 5C or FIG. 5D, the antenna array 211 can dynamically adjust the focusing direction of the RF signal (millimeter wave) WS (i.e., perform beam tracking) to match the direction of the RF signal transmitted by the base station (not shown), thereby obtaining better wireless transmission quality. For example, the focused RF signal WS may be perpendicular to the surface of the antenna array 210 or inclined at an angle of 30 degrees or 60 degrees with respect to the surface of the antenna array 210.

Figure 5A:
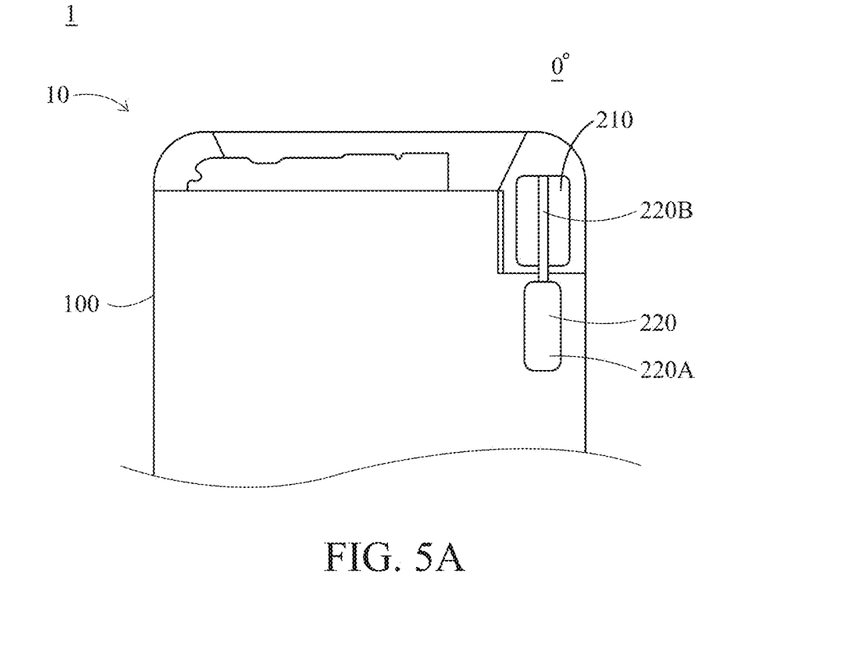
FIG. 5A to FIG. 5D are schematic views illustrating the rotation of an antenna module of the wireless communication device shown in FIG. 1.
Figure 5B:
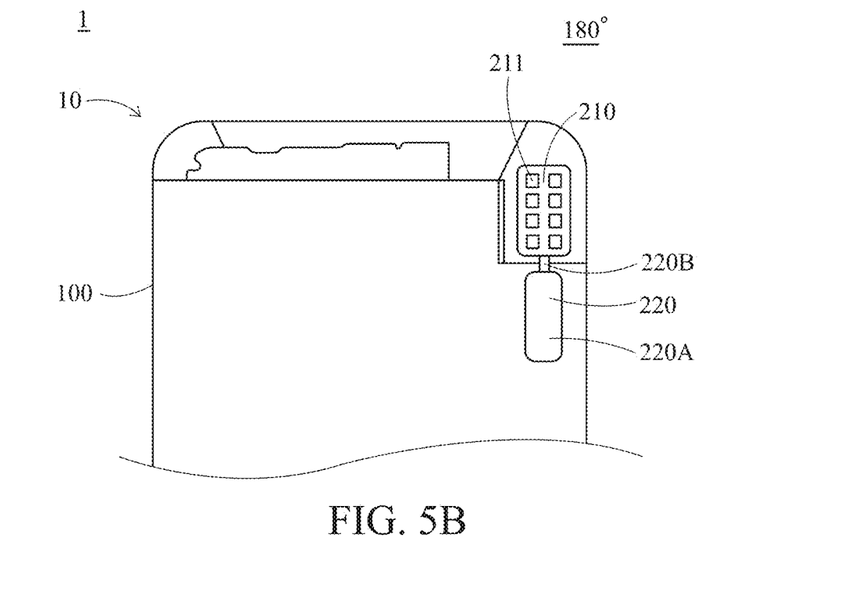
Figure 5C:
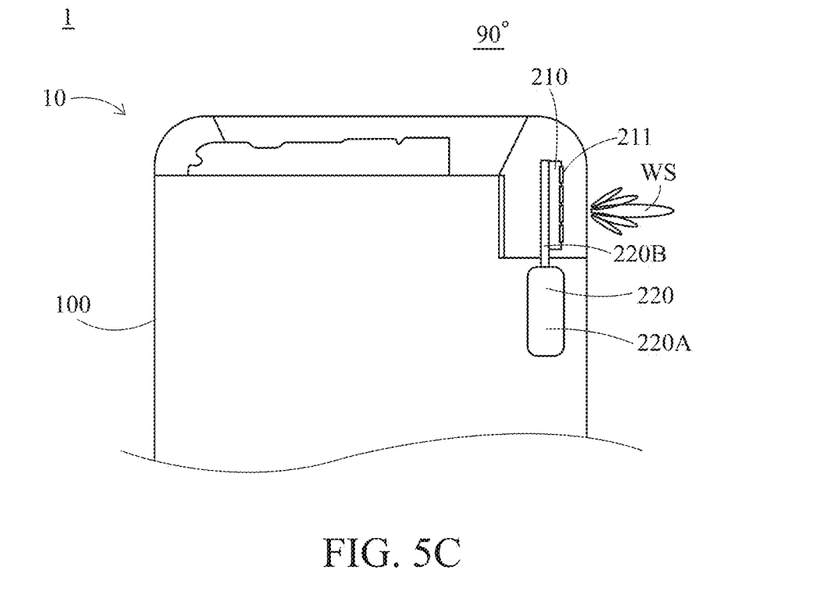
Figure 5D:
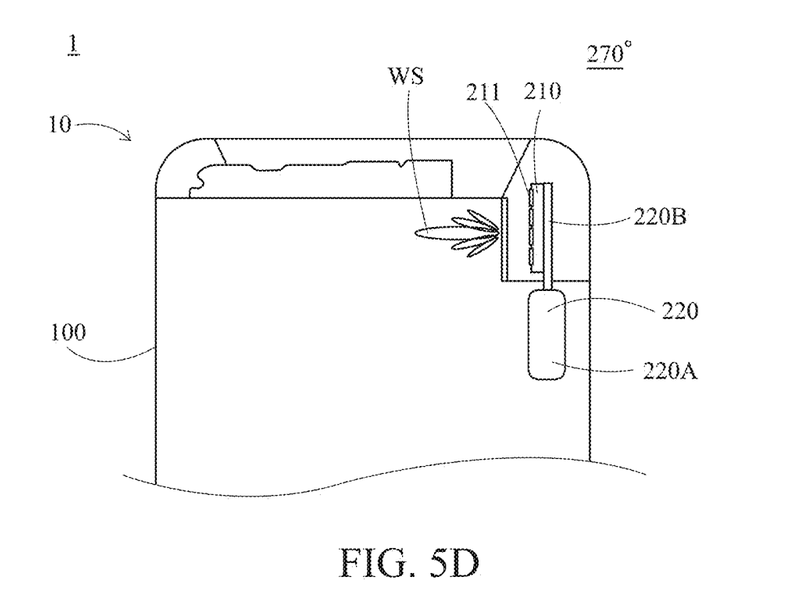

Next, please refer to FIG. 5A to FIG. 5D, which are schematic views illustrating actions of the antenna module 210 and the rotating module 220 shown in FIG. 1. As shown in FIG. 5A, the antenna module 210 may be oriented frontward or backward at the initial state, and the rotating shaft 220B of the rotating module 220 is at the position of 0 degree. After the start of the operation, the rotor motor 220A rotates clockwise or anticlockwise the rotating shaft 220B and the antenna module 210 to various angles (e.g., 90 degrees, 180 degrees, 270 degrees shown in FIG. 5B to FIG. 5D) so that the antenna module 210 is at different orientations for transceiving RF signals. Preferably, the rotating angle of the rotating shaft 220B is not greater than 360 degrees so as to prevent the breakage or damage of a transmission line between the antenna module 210 and the RF signal module 200 due to excessive winding. In other words, the rotating shaft 220B will not rotate continuously in a same direction (the clockwise or anticlockwise direction) but rotates back and forth. In other embodiments, if the antenna module 210 is electrically connected with the RF signal module 200 through a slip ring or the like, then the rotating angle of the rotating shaft 220B may also be greater than 360 degrees without the breakage or damage of the transmission line.

Accordingly, the wireless communication device 1 may enable the antenna module 210 to rotate to different orientations for transceiving RF signals, and maintain the antenna module 210 at an orientation where stronger wireless signals can be received so that better communication quality can be achieved between the wireless communication device 1 and the base station (not shown). Therefore, it is unnecessary for the wireless communication device 1 to comprise multiple fixed antenna modules that respectively have different orientations, so the space inside the housing 100 for accommodating the antenna module is reduce and thus the width or thickness of the housing 100 can be reduced.

Figure 6:
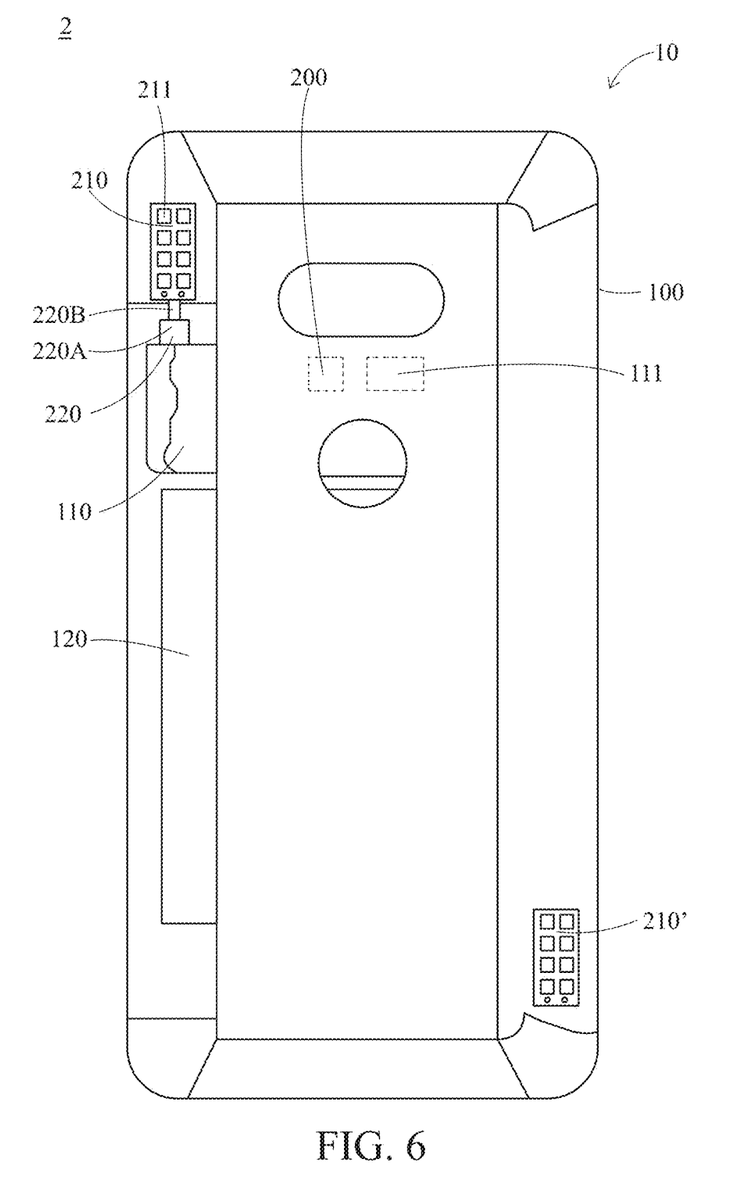
FIG. 6 is a back view of a wireless communication device according to a second preferred embodiment of the present invention.

Next, please refer to FIG. 6, which is a back view of a wireless communication device 2 according to a second preferred embodiment of the present invention. Unlike the wireless communication device 1, the wireless communication device 2 further comprises another antenna module 210' (which is called the antenna module 210' hereinafter) in addition to the rotatable antenna module 210, and the antenna module 210' is accommodated within the housing 100 and located at another side of the RF signal module 200 (i.e., located at another corner of the housing 100) and is electrically connected with the RF signal module 200. More specifically, the two antenna modules 210 and 210' are located at different positions within the housing 100 and are preferably spaced apart from each other to increase the scope in which the RF signal can be received by the wireless communication device 2. That is, if the base station transmits the RF signal towards the lower side of the wireless communication device 2, then the RF signal may be blocked by the palm of the user and thus cannot be received by the antenna module 210, but the RF signal can be received by the antenna module 210'.

The antenna modules 210 and 210' may operate simultaneously, or the antenna module 210' is actuated when the antenna module 210 cannot effectively receive the RF signal. Additionally, in this embodiment, the antenna module 210' is fixed and non-rotatable, but the wireless communication device 2 may also comprise another rotating module (not shown) that is connected with the antenna module 210' so that the antenna module 210' can rotate to receive wireless signals in different directions.

Figure 7:
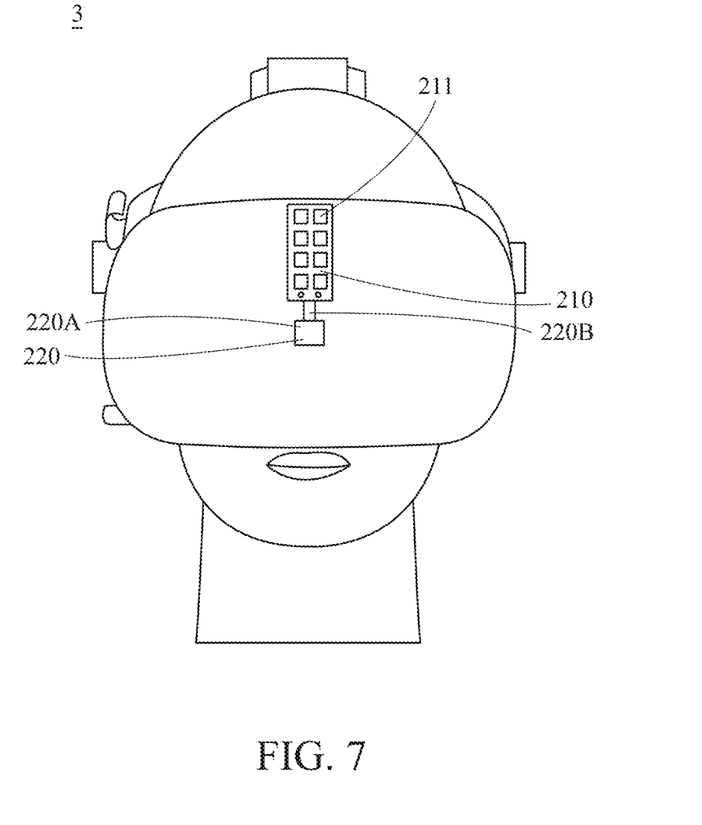
FIG. 7 is a front view of a wireless communication device according to a third preferred embodiment of the present invention.

Next, please refer to FIG. 7, which is a front view of a wireless communication device 3 according to a third preferred embodiment of the present invention. Unlike the wireless communication devices 1 and 2, the wireless communication device 3 is a virtual reality device, and the rotating module 220 within the main body 10 thereof may enable the antenna module 210 to rotate. The wireless communication device 3 may perform wireless communication with a host computer (not shown) or a base station or the like via the antenna module 210. When the user wears the wireless communication device 3 for virtual reality experience, the wireless communication device 3 will be moved from time to time. During this process, the wireless communication device 3 may rotate the antenna module 210 to the orientation where the host computer is located so that better communication quality is maintained between the antenna module 21 and the host computer.

What described above are the technical contents of the wireless communication devices according to the preferred embodiments of the present invention, and next, a wireless communication method according to other preferred embodiments of the present invention will be described. The method may be performed by using the aforesaid wireless communication device (the microprocessor therein), and thus may be regarded as an operation mode of the wireless communication device. Therefore, reference may be made to the technical contents of the wireless communication device for the technical contents of the wireless signal communication method (or vice versa), so the description of the wireless signal communication method is simplified.

Figure 8:
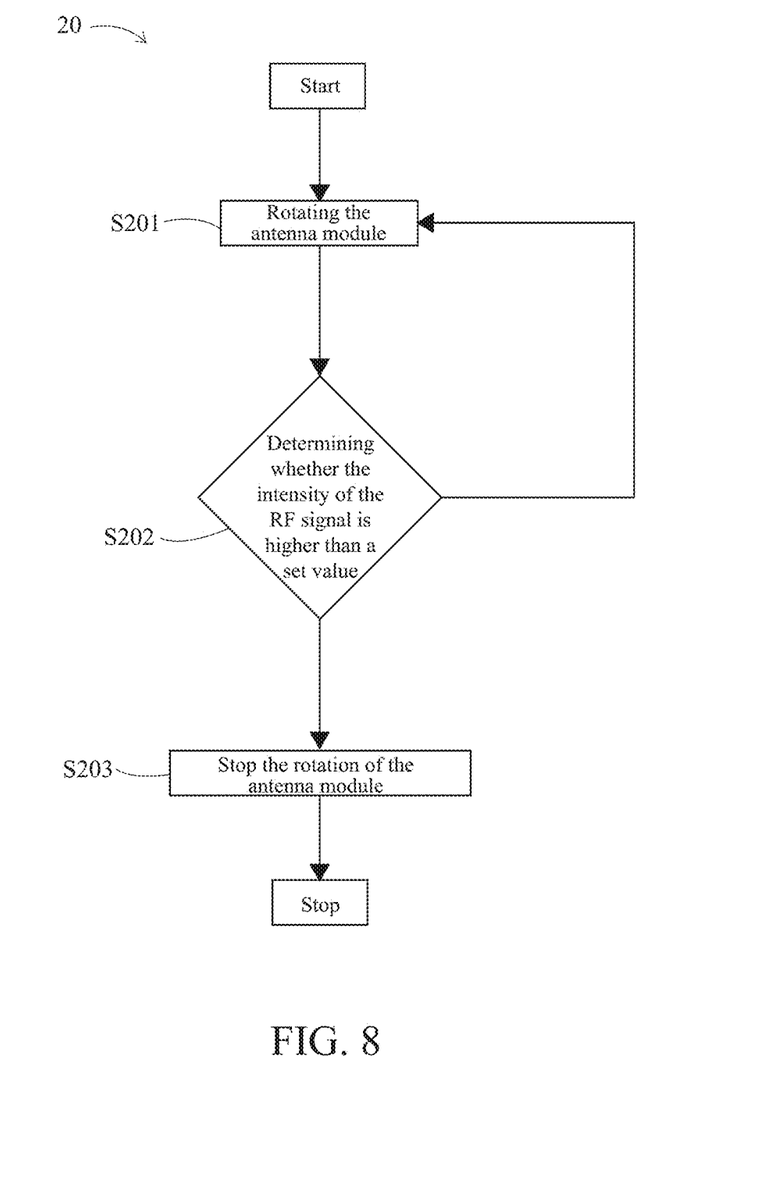
FIG. 8 is a flowchart diagram of a wireless communication method according to a fourth preferred embodiment of the present invention.

Referring to the flowchart diagram illustrating steps of the wireless communication method shown in FIG. 8 and together referring to FIG. 5A to FIG. 5D, when the wireless communication device 1 intends to perform wireless communication, the antenna module 210 attempts to search for a base station, and the microprocessor 111 drives the rotating module 220 to rotate the antenna module 210 so that the antenna module 210 is oriented in a certain direction (step S201); then, the microprocessor 111 determines the intensity of an RF signal received by the antenna module 210 (step S202); the microprocessor 111 stops the rotation of the antenna module 210 if it is determined that the intensity is higher than a set value, and the antenna module 201 establishes connection with the base station at this orientation so as to perform wireless communication (step S203); if it is determined that the intensity is lower than a set value, then the processor 111 again rotates the antenna module 210 so that the antenna module is oriented in another direction (step S201). The aforesaid steps S201 and S202 may be repeated for several times until the microprocessor 111 determines that the antenna module 210 has received the RF signal of sufficient intensity.

The microprocessor 111 may also rotate the antenna module 210 by a circle (360 degrees) and store the intensity of the RF signals received by the antenna module 210 at different rotating angles (e.g., 0, 30, 60, 90, 120, 150, 180, 210, 240, 270, 300 and 360 degrees) so as to establish relationships between the current rotating angles of the antenna module 210 and the intensity of the RF signals. Thereafter, the microprocessor 111 can rotate the antenna module 210 to the orientation where the RF signal of the largest intensity is received. If no RF signal of sufficient intensity is received at various rotating angles when the antenna module 210 is rotated by a circle, then the microprocessor 111 may actuate another antenna module 210' (as shown in FIG. 5) to increase the scope in which the RF signal can be received. Alternatively, a display may be used to prompt the user that the antenna module 210 currently cannot receive the RF signal of sufficient intensity so that the user moves the wireless communication device 1 to other places.

On the other hand, if the antenna module 210 is disconnected from the base station when the wireless communication device 1 is moved to other places by the user, then the aforesaid steps will be again performed to re-establish the connection between the antenna module 210 and the base station.

According to the above descriptions, the wireless communication device and method of the present invention can rotate the antenna module to different orientations for transceiving RF signals without the use of multiple antenna modules, and thus the usage space inside the wireless communication device can be saved. Moreover, the orientation of the antenna module for transceiving wireless signals can be dynamically adjusted in response to the location of the base station so that better communication quality can be maintained between the antenna module and the base station.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication device, comprising:
    a main body, comprising a housing and an RF signal module accommodated in the housing, the housing further comprises a display;
    a rotating module, being accommodated in the housing and located at a first corner of the wireless communication device, and comprising a rotor motor and a rotating shaft, the rotor motor being connected to the rotating shaft for rotating the rotating shaft;
    a first antenna module, being accommodated in the housing and disposed on the rotating shaft, and being electrically connected to the RF signal module, wherein the first antenna module comprises an antenna array for beamforming RF signals to a side of the wireless communication device; and
    a second antenna module, being accommodated within the housing and located at a second corner of the wireless communication device which is diagonal to the first corner, wherein the second antenna module is actuated when the first antenna module cannot effectively receive an RF signal or both of the antenna modules can operate simultaneously.

2. The wireless communication device of claim 1, wherein the rotating shaft is directly connected to the rotor motor.

3. The wireless communication device of claim 1, wherein the rotating module further comprises a transmission mechanism, and the rotating shaft is connected to the rotor motor through the transmission mechanism.

4. The wireless communication device of claim 1, wherein the rotating angle of the rotating shaft is not greater than 360 degrees.

5. A wireless signal communication method, comprising:
    rotating a first antenna module within a wireless communication device, wherein the first antenna module is located at a first corner of the wireless communication device, and the first antenna module comprises an antenna array for beamforming RF signals to a side of the wireless communication device;
    determining the intensity of an RF signal received by the antenna module;
    stopping the rotation of the antenna module; and
    actuating a second antenna module when the first antenna module cannot effectively receive the RF signal or both of the antenna modules can operate simultaneously, wherein the second antenna is located at a second corner of the wireless communication device which is diagonal to the first corner.

6. The wireless communication method of claim 5, further comprising stopping the rotation of the first antenna module when it is determined that the intensity of the RF signal received by the first antenna module is higher than a set value.

7. The wireless communication method of claim 5, further comprising rotating the first antenna module to another orientation when it is determined that the intensity of the RF signal received by the first antenna module is lower than a set value.

8. The wireless communication method of claim 5, further comprising rotating the first antenna module by a circle to establish relationships between rotating angle of the first antenna module and intensity of the RF signal.

9. The wireless communication method of claim 5, wherein rotating angle of the first antenna module is not greater than 360 degrees.

* * * * *